May 19, 1953 W. R. BREVETTI 2,638,668
SCOOPING AND MEASURING UTENSIL
Filed May 7, 1951
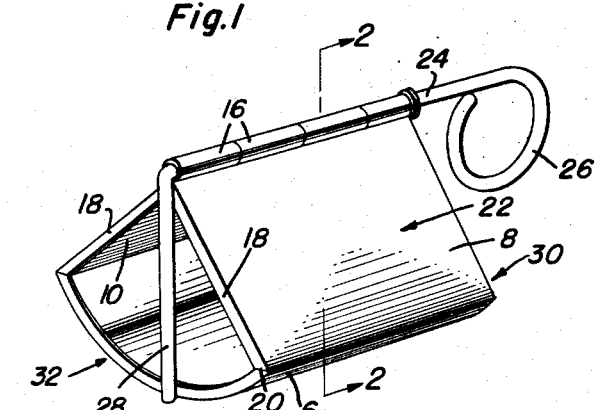
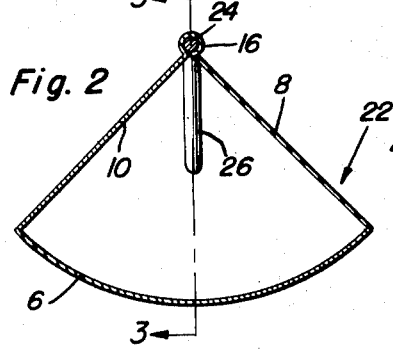
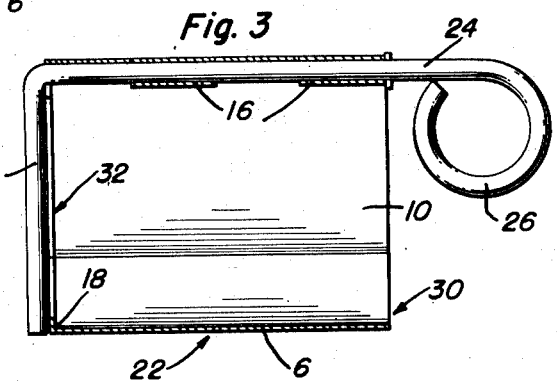
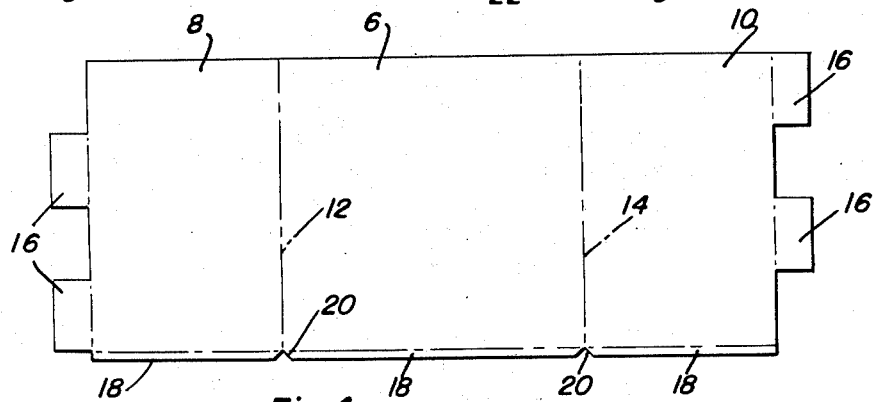
Walter R. Brevetti
INVENTOR.

Patented May 19, 1953

2,638,668

UNITED STATES PATENT OFFICE 2,638,668

SCOOPING AND MEASURING UTENSIL

Walter R. Brevetti, Highland, N. Y.

Application May 7, 1951, Serial No. 224,905

1 Claim. (Cl. 30—115)

The present invention relates to certain new and useful improvements in handy implements and devices which come under the broad classification of kitchen utensils and has more particular reference to a unique manually usable implement which will enable a user to conveniently scoop an approximately measured amount of vegetable shortening from a can or container, which may then be easily discharged and thus made ready for use where a particular recipe calls for an estimated amount of said shortening.

At the present time all sorts of makeshift implements and tools are employed and because of this we find housewives, cooks and others resorting to the use of spoons, knives, forks and, where large quantities are used, handle equipped and equivalent cups. There has long existed a need for a simple, economical and practical utensil which may be forcibly pressed into the contents of the can and subsequently lifted out in a predetermined amount and discharged into a bowl, pan or wherever it may be needed.

It is an object of the present invention to structurally, functionally and otherwise improve upon so-called measuring type cutters for lard, butter, vegetable shortening and so on and, in so doing, to improve upon and reduce the number of parts entering into the combination, thereby not only increasing the efficiency of the structure as a whole, but rendering the same less costly to manufacture and to otherwise simplify factors of assembling and sale.

A further, but somewhat more general object of the invention is to provide a simple and economical kitchen utility or utensil in which manufacturers, users and others will find their primary requirements and essential needs fully met.

More specifically, novelty is predicated on an open ended scoop. This is preferably, but not necessarily, quadrantal in form. The discharge end is comparatively sharp and unobstructed and the intake end is provided with an inturned lip forming flange. In addition, there is a severing blade or knife and the latter may be swiped back and forth for enhancing the use of the implement and to assist in measuring and handling the charge or load which is taken up by the scoop.

Other objects and advantages will become more readily apparent from the following description and the accompanying sheet of illustrative drawings.

In the accompanying drawings wherein like numerals are employed to designate like parts throughout the views:

Figure 1 is a perspective view of a dislodging, scooping and measuring utensil constructed in accordance with the principles of this invention, the clearing blade being shown in a centered position;

Figure 2 is a cross section taken approximately on the vertical line 2—2 of Figure 1, looking in the direction of the arrows;

Figure 3 is a central longitudinal sectional view taken on the line 3—3 of Figure 2, looking in the direction of the arrows; and Figure 4 is a plan view of the blank from which the scoop is formed.

By way of introduction to the detailed description, it is to be pointed out that the part of the utensil which appears to be a container or receiver is perhaps best identifiable as a miniature scoop in that it assists the use in scooping up the charge or load to be taken in and thereafter constitutes a measuring receiver. Nevertheless, it is felt that the expression "scoop" may be appropriately applied to this part and the description will proceed accordingly. It is to be mentioned here that the scoop may be made from sheet material, for example, satisfactorily formed from appropriate aluminum. Some other metal might well serve and the entire scoop may be cast as a single entity; or, a suitable commercial plastic may be used. This aspect of the matter will be governed by the requirements of the manufacturers and others. In any event, the preferred embodiment of the scoop is one which is constructed from sheet material and a simple mode of doing so is to employ a flat substantially rectangular blank of sheet material as illustrated in Figure 4. This comprises a central portion 6 and narrower corresponding end portions 8 and 10 joined by fold lines 12 and 14.

It will be noticed that the outer marginal edges of the so-called end portions 8 and 10 are provided with rectangular extensions or ears 16—16 and these are rolled or bent upon themselves to provide assembling and hinging knuckles in the manner illustrated. The edge portions 18—18 are bent to provide reinforcing and shearing flanges, these being associated or interconnected by way of V-shaped notches 20—20 in alignment with the respective folds or bends 12 and 14. Referring to the finished scoop this, as a unit, is denoted by the numeral 22. Said scoop has its center portion of arcuate or curvate form to provide the desired convex formation. The sides 8 and 10 converge and the knuckles 16 are lined up to provide suitable assembling elements or bearings. These bearings serve to accommodate the stem portion of an L-shaped rod member, that is, the portion 24 of said member as best shown in Figure 3. One end of this rod member is bent upon itself to form a finger-gripping hook or eye 26. The opposite shorter limb is laterally directed, as at 28, and provides a shearing and clearing "knife" in an obvious manner. The finished scoop is substantially quadrantal in cross section and has its opposite ends substantially open. The non-flanged end, denoted at 30, is the discharge end. The flanged end 32 is the intake end. The shearing knife has wiping contact with the coacting flanges and the flanges not only reinforce but actually restrict the cross section of the charge or load which enters into and is trapped by the scoop.

Therefore, the load which is pressed into the scoop is usually of a cross section slightly less than the cross section of the scoop, making it possible to discharge the load through the end at 30 in a free and unobstructed manner, simply by exerting a slight push against said load or charge.

When using the device, the curvate wall 6 serves as a sort of runner and conforms in some respects to the cylindrical wall of the can or other container for the shortening. By catching hold of the finger-piece on the rod and forcing the entire utensil down with the curvate wall riding or sledding against the curvate wall of the can, the scoop forcibly pushes its way down and in so doing, the contents of the can finds its way through the intake end 32 and the charge or load is measured and then subsequently lifted out for use. By turning the scoop upside down, so to speak, the trapped charge or load may be pushed from the scoop with a finger through the discharge end 30. Before shoving the scoop down into the contents of the can, it is desirable to swing the knife blade 28 to one side, thus leaving the intake end 32 unobstructed. However, before lifting the device out, it is desirable to sweep or swipe the knife back and forth to break the load loose from the main mass in the can and to continue to oscillate the knife to wipe off the surplus and to thus be in a position to substantially measure the amount which has been trapped in the scoop. It is also desirable to move the blade 28 back to the center when withdrawing or lifting the load out so that the blade in this position provides a lifting finger and prevents the load from dropping out of the scoop through the wrong end.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

A utensil of the class described comprising an open ended scoop of segmental cross-sectional form embodying a pair of converging complemental walls provided with aligned knuckles along their meeting converging edges and a curvate central wall interconnecting the remaining edges, all of said walls having their essential internal and external surfaces free of projections, said walls being provided at corresponding ends with coplanar laterally disposed flanges circumscribing the corresponding open end of the scoop, the inner marginal edge portions of said flanges cooperating in defining a segmental intake opening, the corresponding ends of said walls at the opposite end of the scoop being without flanges and defining a segmental discharge opening which is of a size greater than the size of said first-named segmental opening, a rod member passing through and interconnecting the knuckles and provided at the end adjacent the discharge opening of the scoop with a finger ring and provided at its opposite end with a right angularly disposed shearing and levelling off blade, the latter having wiping contact with the exterior surfaces of said flanges.

WALTER R. BREVETTI.

References Cited in the file of this patent

UNITED STATES PATENTS

| Number | Name | Date |
|---|---|---|
| 172,767 | Patton | Jan. 25, 1876 |
| 916,714 | Kapelman | Mar. 30, 1909 |
| 1,333,387 | Cato | Mar. 9, 1920 |